US009081866B2

(12) United States Patent
Coleman et al.

(10) Patent No.: US 9,081,866 B2
(45) Date of Patent: Jul. 14, 2015

(54) DYNAMIC DISPLAY OF WEB PAGE CONTENT BASED ON A RULES SYSTEM

(75) Inventors: Barry Coleman, San Jose, CA (US); Frank McCarry, Ballycastle (GB)

(73) Assignee: Oracle International Corporation, Redwood Shores, CA (US)

( * ) Notice: Subject to any disclaimer, the term of this patent is extended or adjusted under 35 U.S.C. 154(b) by 146 days.

(21) Appl. No.: 13/241,417

(22) Filed: Sep. 23, 2011

(65) Prior Publication Data

US 2013/0080874 A1    Mar. 28, 2013

(51) Int. Cl.
*G06F 17/00*    (2006.01)
*G06F 17/30*    (2006.01)
*G06F 17/10*    (2006.01)

(52) U.S. Cl.
CPC ................................ *G06F 17/30893* (2013.01)

(58) Field of Classification Search
CPC ................................ G06F 17/211; G06F 17/28
USPC .......................................................... 715/234
See application file for complete search history.

(56) References Cited

U.S. PATENT DOCUMENTS

| | | | |
|---|---|---|---|
| 6,115,718 A | 9/2000 | Huberman et al. | |
| 6,408,290 B1 | 6/2002 | Thiesson et al. | |
| 6,430,305 B1 | 8/2002 | Decker | |
| 6,496,816 B1 | 12/2002 | Thiesson et al. | |
| 6,529,891 B1 | 3/2003 | Heckerman | |
| 6,553,352 B2 | 4/2003 | Delurgio et al. | |
| 6,779,119 B1 | 8/2004 | Moshfeghi et al. | |
| 6,801,909 B2 | 10/2004 | Delgado et al. | |
| 6,836,773 B2 | 12/2004 | Tamayo et al. | |
| 6,895,398 B2 | 5/2005 | Evans-Beauchamp et al. | |
| 7,113,917 B2 | 9/2006 | Jacobi et al. | |
| 7,328,201 B2 | 2/2008 | D'Ambrosio | |
| 7,499,948 B2 * | 3/2009 | Smith et al. ........................... 1/1 |
| 7,870,084 B2 | 1/2011 | D'Ambrosio | |
| 2001/0014868 A1 | 8/2001 | Herz et al. | |
| 2001/0021914 A1 | 9/2001 | Jacobi et al. | |
| 2002/0062245 A1 | 5/2002 | Niu et al. | |
| 2005/0209903 A1 * | 9/2005 | Hunter et al. ..................... 705/9 |
| 2006/0179421 A1 * | 8/2006 | Bielski et al. ................. 717/115 |
| 2007/0233902 A1 * | 10/2007 | Trefler et al. ................. 709/246 |
| 2008/0208785 A1 * | 8/2008 | Trefler et al. .................... 706/47 |
| 2009/0125469 A1 * | 5/2009 | McDonald et al. ............. 706/47 |
| 2009/0132232 A1 * | 5/2009 | Trefler .............................. 704/2 |
| 2009/0240531 A1 * | 9/2009 | Hilborn ............................ 705/4 |
| 2010/0125762 A1 * | 5/2010 | Nie et al. ......................... 714/49 |
| 2011/0137832 A1 | 6/2011 | D'Ambrosio | |
| 2012/0290974 A1 * | 11/2012 | Doig et al. ..................... 715/808 |

OTHER PUBLICATIONS eStara, "Rules-Based Triggers FAQ," Copyright 2007.
LivePerson, "LiveAlerts," http://solutions.liveperson.com/help/livealert.asp (last visited Aug. 22, 2011).

(Continued)

*Primary Examiner* — James J Debrow
(74) *Attorney, Agent, or Firm* — Miles & Stockbridge PC

(57) ABSTRACT

A rules system can store one or more rules within a data store, and can deploy the one or more rules as one or more rule scripts, so that the one or more rule scripts are loaded by a rules server. The rules system can then receive requests from a browser engine contained within a web page and execute the one or more rule scripts loaded by the rules server to generate data. The rules system can then transmit the generated data to the browser engine contained within the web page.

20 Claims, 5 Drawing Sheets

(56) References Cited

OTHER PUBLICATIONS

LivePerson, "Creating Rules to Automatically Capture Visit Information," http://base.liveperson.net/hc/s-5296924/cmd/kbresource/kb-6343261275199944167/view_question!PAGETYPE?sc=4582&sf=101133&documentid=397902&action=view (last visited Aug. 22, 2011).

Akami, "Advanced Cache Control," http://www.akamai.com/dl/featuere_sheets/fs_edgesuite_adv_cachecontrol.pdf (last visited Aug. 22, 2011).

University of Pennsylvania, "Caching Description," http://www.upenn.edu/computing/web/central-host/caching/caching-description.html (last visited Aug. 22, 2011).

Greenspan, H., et al., "Learning Texture Discrimination Rules in a Multiresolution System," IEEE Transactions on Pattern Analysis and Machine Intelligence, vol. 16, No. p, pp. 894-901, Sep. 1994.

D'Ambrosio B. et al., "Probabilistic Relational Models of On-line User Behavior: Early Explorations," Proceedings of the Fifth WEBKDD workshop; Webmining as a Premise to Effective and Intelligent Web Applications (WEBKDD'2003), in conjunction with ACM SIGKDD conference, Washington, DC, USA, Aug. 27, 2003, pp. 9-16.

* cited by examiner

DYNAMIC DISPLAY OF WEB PAGE CONTENT BASED ON A RULES SYSTEM

FIELD

One embodiment is directed to a computer system, and more particularly, to controlling web page content using the computer system.

BACKGROUND

In general, when an end-user utilizes a web browser to navigate to a web page of a website, the web page includes content that can be displayed within the browser. The content is generally created by the website owner. However, is some cases, the web page also includes references to content created by a third-party provider. For example, the web page can also include an advertisement of a website owned by the third-party provider. Thus, the web page can cause content to be displayed within the browser that is created by the third-party provider, in addition to content that is created by the website owner.

In some cases, the third-party content is static content. However, in other cases, the third-party content can be dynamic content rather than static content. For example, the third-party content may include different content based on what type of browser the end user is utilizing, how many times the end user has navigated to the current web page, or which web page of the website the end-user has navigated to. In cases where the third-party content is dynamic, the web page may not actually include the third-party content, but instead may include a reference to a system of a third-party provider that is responsible for determining which third-party content to display within the browser and providing the third-party content to the web page. The third-party provider's system is then required to determine which third-party content to display within the website, and to upload the third-party content to the website to be displayed within the browser. Determining which third-party content to display can involve a single query, or many queries, to a database located within the third-party provider's system.

Such queries to the database can be expensive in terms of processing time, and thus, can significantly increase the overall time required to display content within the web page displayed within the end-user's browser. Furthermore, the third-party content that is generated and uploaded to the web page can be significantly large, which can also increase the overall time required to display content within the web page, depending on a speed of a connection between the web browser and either the website or the system of the third-party provider. In addition, when the third-party content that is generated for the web page is dynamic, the third-party content can be different each time the end-user navigates to the web page, and thus, the dynamic third-party content can prevent caching of the web page by the browser. Also, when modifications are made to logic that is used to determine the third-party content to display within the website, the modifications are generally introduced to the system immediately. A modification can be an erroneous modification, or can produce unintended effects within the system. Erroneous modifications, or modifications that produce unintended effects, can impact the system instantaneously and can disrupt the performance of the system. All of this can make it difficult to maintain a consistent and efficient overall performance of a website that includes third-party content. In addition, it can be difficult for a website owner to evaluate the overall content displayed by one or more web pages, as some of the overall content includes third-party content that is only dynamically generated at the time the end-user navigates to the web page using a browser.

SUMMARY

One embodiment is directed to a computer-readable medium having instructions stored thereon that, when executed by a processor, cause the processor to control content displayed within a web page. The instructions include retrieving one or more rules stored within a data store, where each rule includes one or more conditions and one or more actions, and where each action includes an instruction to display content within the web page. The instructions further include creating one or more rule scripts based on the one or more rules, wherein each rule script includes executable code. The instructions further include receiving a request from a browser engine contained within the web page. The instructions further include executing at least one rule script from the one or more rule scripts to generate data. The instructions further include transmitting the data generated by the at least one rule script to the browser engine contained within the web page.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a collection of rules can be created by a user and stored within a data store. The collection of rules can be, for example, a collection of rules that control content displayed within a web page. From this collection of rules, one or more rules can be deployed based on a filter, where the one or more rules are read from the data store and transformed into one or more rule scripts. The one or more rule scripts can each be loaded into a rules server and can be converted into executable code in the rules server, where the executable code can be stored in a memory of the rules server. Furthermore, according to the embodiment, a web page of a website can include a browser engine that includes a reference to the server containing the executable code. An end user can navigate to the web page using the web browser, and the browser can transmit a request to the server, where the request includes identifying data. The server can use the identifying data contained within the request to select one or more rule scripts that have been loaded into the server and converted into executable code. The executable code of the one or more rule scripts can be executed to generate data, and the generated data can be transmitted to the browser. The browser can utilize the data to display dynamic content to the end-user, so that the dynamic content appears to be included within the web page.

In general, in one embodiment, a web page is a resource, such as one or more computer files (i.e., files), that can be accessed using a web browser and be displayed within the browser. A web page can be comprised of static content, dynamic content, or a combination of the two. A web page can include a markup language designed to interpret content of the web page, such as HyperText Markup Language ("HTML") or Extensible Hypertext Markup Language ("XHTML"), and a style sheet designed to provide layout, typographic, and color information. A website is a collection of one or more related web pages.

Furthermore, in one embodiment, a condition is data, information, or a fact that can be verified. An action is an instruction, or logic, that can be implemented. A rule is a collection of one or more conditions, and one or more corresponding actions, where the rule can be composed by a user and stored in a tangible medium, such as a data store. A rule set is a collection of one or more rules treated as a logical unit. A filter is a condition on a rule set. In other words, a filter is a mechanism to apply a rules set under a specific condition. A rule script is an executable script containing one or more rules sets. A page engine is a script containing computer code that can be used by one or more rules scripts. An end-user is a user that utilizes a web browser to navigate to one or more web pages of a website. A session is a series of activities performed by an end-user on one or more web pages of a website, within a specified time frame.

Figure 1:
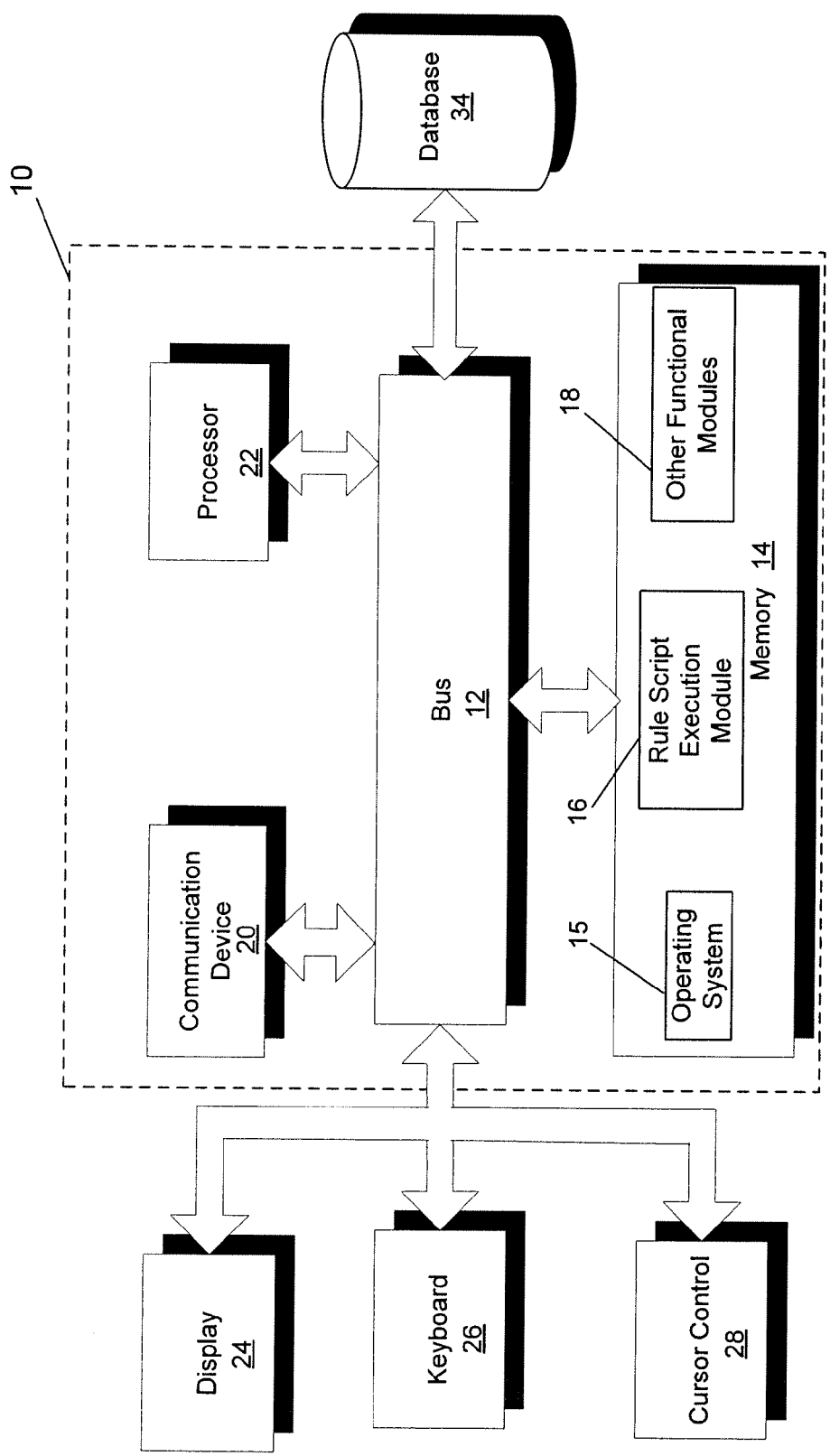
FIG. 1 illustrates a block diagram of a rules system that can implement an embodiment of the invention.

FIG. 1 illustrates a block diagram of a rules system 10 that can implement one embodiment of the invention. Rules system 10 includes a bus 12 or other communication mechanism for communicating information between components of rules system 10. Rules system 10 also includes a processor 22, operatively coupled to bus 12, for processing information and executing instructions or operations. Processor 22 may be any type of general or specific purpose processor. Rules system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Rules system 10 further includes a communication device 20, such as a network interface card or other communication interface, to provide access to a network. As a result, a user may interface with rules system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with rules system 10.

According to one embodiment, memory 14 can store software modules that may provide functionality when executed by processor 22. The modules can include an operating system 15, a rule script execution module 16, as well as other functional modules 18. Operating system 15 can provide an operating system functionality for rules system 10. Rule script execution module 16 can provide functionality for generating and executing rule scripts to control content displayed within a web page, as will be described in more detail below. Rules system 10 can also be part of a larger system. Thus, rules system 10 can include one or more additional functional modules 18 to include the additional functionality. For example, functional modules 18 may include modules that are part of a "Live Help" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
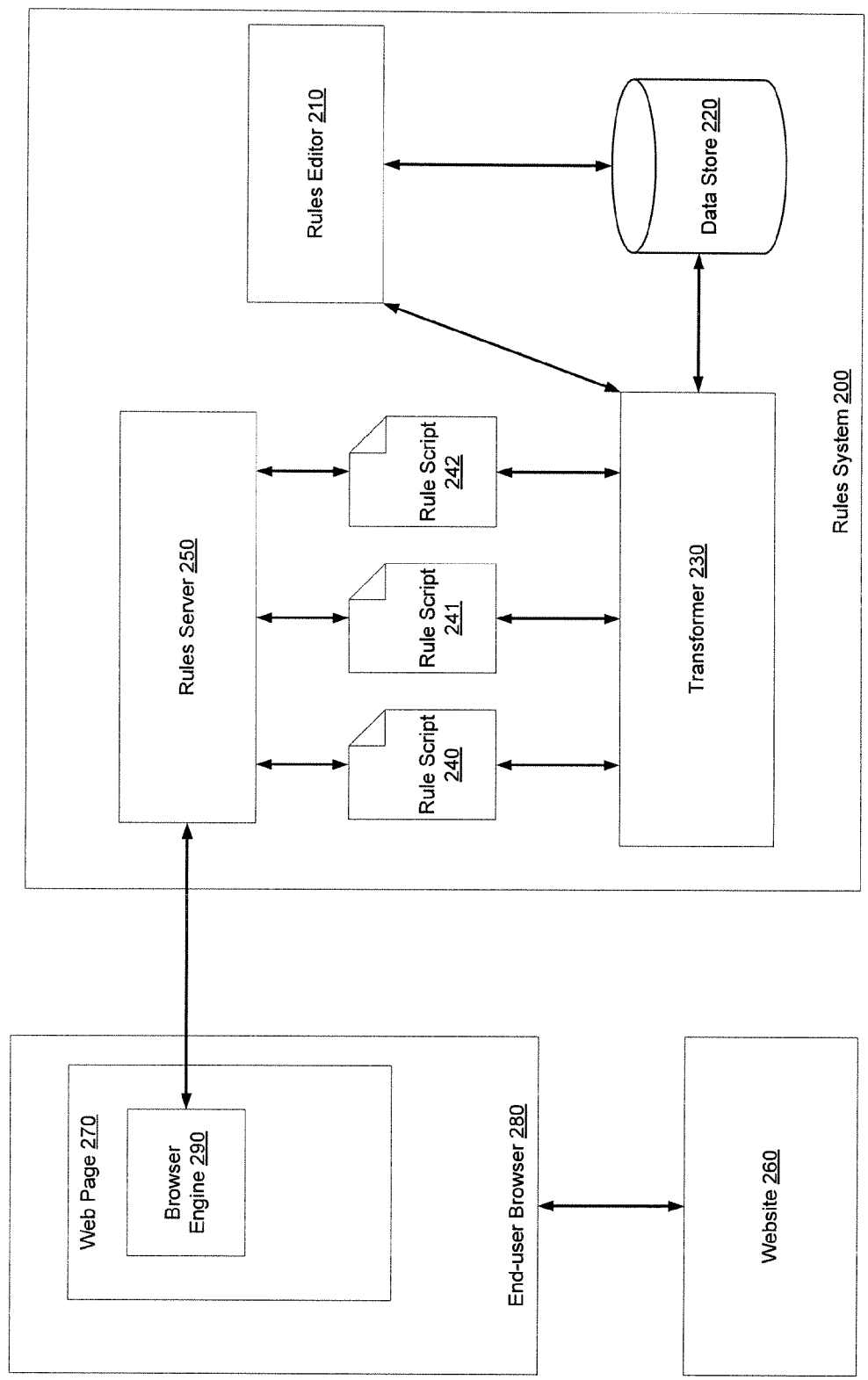
FIG. 2 illustrates a block diagram of a website operatively coupled to a rules system according to an embodiment of the invention.

FIG. 2 illustrates a block diagram of a website operatively coupled to a rules system 200 according to an embodiment of the invention. In one embodiment, rules system 200 is identical to rules system 10 illustrated in FIG. 1. In accordance with the illustrated embodiment of FIG. 2, rules system 200 includes rules editor 210. Rules editor 210 is a web-based editor that can allow a user of rules system 200 to define one or more rules. More specifically, rules editor 210 can display a user interface to a user within a web browser, and a user can interface with rules editor 210, using the user interface of the web browser, to define one or more rules. Defining one or more rules can include creating one or more rules, modifying one or more rules, or a combination of the two. The creation or modification of a rule can include creating or modifying one or more conditions and one or more related actions for the rule. An action for a rule can control an operation of one or more web pages of a website that is operatively coupled to rules system 200. For example, an action for a rule can control a display of content within one or more web pages of a website operatively coupled to rules system 200.

According to the embodiment, rules system 200 includes data store 220. A rule created or modified by rules editor 210 can be stored within data store 220. Data store 220 can be any type of data store configured to store data. In one embodiment, data store 220 can be a database, such as a relational database. In an alternate embodiment, data store 220 can be a file, or a file system that includes a plurality of files. Furthermore, data store 220 can store any type of data. In certain embodiments, data store 220 can store one or more rules. In some of these embodiments, the one or more rules stored within data store 220 can be organized into one or more rule sets. However, in other embodiments, the one or more rules stored within data store 220 are not organized into rule sets.

According to the embodiment, a rule that is stored within data store 220 is not immediately accessible by the other components of rule system 200. Instead, a rule is required to be deployed before the rule is accessible by the other components of rule system 200. As described below in greater detail, the deployment of a rule can include the transformation of a rule that is stored within data store 220 to a rule script.

Rules system 200 also includes transformer 230, in accordance with the embodiment. Rules editor 210 can transmit a deployment command to transformer 230, where the deployment command can include a command to deploy one or more rules. The deployment command can also include a filter that can be applied to the one or more rules stored within data store 220. For example, the deployment command can include a command to deploy one or more rules associated with a specific website. In this example, the one or more rules associated with a specific website can be organized into a rule set.

Upon receiving the deployment command, transformer 230 can access data store 220 and retrieve one or more rules from data store 220 based on the deployment command. According to an embodiment, where a deployment command includes a filter, transformer 230 can apply the filter to data store 220. More specifically, transformer 230 can filter the rules that are retrieved from data store 220 so that only the rules that satisfy the filter associated with the deployment command are returned.

Upon retrieving the one or more rules from data store 220, transformer 230 creates one or more rule scripts (illustrated in FIG. 2 as rule scripts 240, 241, and 242). based on the one or more rules retrieved from data store 220. In one embodiment, transformer 230 can create a rule script that corresponds to each website that is operatively coupled to rules system 200. According to this embodiment, each website is defined using a request attribute, where the defined request attribute is stored within data store 220. In one embodiment, the request attribute is a Uniform Resource Locator ("URL") attribute. Furthermore, in certain embodiments where transformer 230 creates a rule script for each website operatively coupled to rules system 200, transformer 230 can also create an additional rule script that can be used to select the rule script that corresponds to the correct website.

According to the embodiment, transformer 230 creates rule scripts 240, 241, and 242 by generating executable code for each rule selected from data store 220 and storing the executable code within a rule script of rule scripts 240, 241, and 242. Thus, each rule script of rule scripts 240, 241, and 242 includes executable code. Transformer 230 can generate executable code of any programming language. In certain embodiments, transformer 230 can generate executable code of a compiled language, such as Java®, C, or C++. In an embodiment where transformer 230 generates executable code of a compiled language, transformer 230 can either include, or be operatively coupled to, a compiler that compiles the executable code generated by transformer 230. Thus, according to the embodiment, the executable code generated by transformer 230 is pre-compiled. In alternate embodiments, transformer 230 can generate executable code of a scripting language, such as JavaScript or Lua. In an embodiment where transformer 230 generates executable code of a scripting language, transformer 230 can process the generated executable code. Thus, according to the embodiment, the executable code generated by transformer 230 is pre-processed.

In one embodiment, transformer 230 creates synthetic variable rule scripts 240, 241, and 242. According to this embodiment, transformer 230 creates synthetic variable rule scripts 240, 241, and 242, by generating executable code of a synthetic variable scripting language for each selected rule. The generated executable code of the synthetic variable scripting language is stored within a synthetic variable rule script of synthetic variable rule scripts 240, 241, and 242. Thus, each rule script of synthetic variable rule scripts 240, 241, and 242 includes executable code. A synthetic variable scripting language is a scripting language for constructing synthetic variables, where a synthetic variable comprises a chain of elements (i.e., an expression), where an element comprises a set of selection phrases, and where each element serves as a mapping from input data to output data. The synthetic variables can be constructed based on a synthetic grammar. A synthetic variable scripting language can utilize XML files to construct the synthetic variables, and the synthetic variable scripting language can be used to create synthetic variable rule scripts that have a highly optimized runtime. In order to modify a synthetic variable rule script, an XML file of a synthetic variable rule script can be modified. Embodiments of a synthetic variable scripting language are described in U.S. patent application Ser. No. 12/948,027, entitled "RELATIONAL BAYESIAN MODELING FOR ELECTRONIC COMMERCE," incorporated by reference herein. As previously described, this embodiment is only an example embodiment, and transformer 230 can generate executable code of any programming language.

According to the embodiment, rules system 200 also includes rules server 250. Once transformer 230 has created rule scripts 240, 241, and 242, transformer 230 can transmit a notification to rules server 250 that rule scripts 240, 241, and 242 have been created. Upon receiving the notification, rules server 250 can load rule scripts 240, 241, and 242 within rules server 250, and store rule scripts 240, 241, and 242 within a memory of rules server 250, where each of rule scripts 240, 241, and 242 include executable code. In an embodiment where rule scripts 240, 241, and 242 each include executable code of a compiled language, rules server 250 can dynamically convert each of rule scripts 240, 241, and 242 into a compiled class that can be stored and executed within the memory of rules server 250. Thus, according to the embodiment, rules server 250 does not directly access data store 210 (such as performing a database read in an embodiment where data store 210 is a database, or performing a file retrieve in an embodiment where data store 210 is a file or file system) in order to load a rule script, such as rule scripts 240, 241, and 242. Instead, each rule script of rule scripts 240, 241, and 242 is stored within a memory of rules server 250. Thus, rule scripts 240, 241, and 242 can be executed by rules server 250 very rapidly. Furthermore, by generating executable code that makes up rule scripts 240, 241, and 242 during deployment of the rule scripts, rather than during runtime execution of the rule scripts, a processing time associated with rule scripts 240, 241, and 242 can be greatly reduced. This can dramatically improve overall performance of rules system 200 and also make the operation of rules system 200 more predictable.

In an embodiment, where rule scripts 240, 241, and 242 are synthetic variable rule scripts, rules server 250 can load synthetic variable rule scripts 240, 241, and 242 within rules server 250 and store synthetic variable rule scripts 240, 241, and 242 within a memory of rules server 250, where each of synthetic variable rule scripts 240, 241, and 242 include executable code. According to the embodiment, rules server 250 can dynamically convert each of synthetic variable rule scripts 240, 241, and 242 into a compiled class that can be stored and executed within the memory of rules server 250. In one embodiment, the compiled class is a compiled Java® class. However, this is only an example embodiment, and rules server 250 can dynamically convert each of synthetic variable rule scripts 240, 241, and 242 into a compiled class of any programming language.

According to the embodiment, rules system 200 is operatively coupled to website 260. Website 260 is a collection of one or more web pages provided by a provider. Website 260 can receive a request from a web browser and can transmit a web page to the web browser to be displayed within the web browser in response to the request. In one embodiment, the request from the web browser is a Hypertext Transfer Protocol ("HTTP") request. In the illustrated embodiment of FIG. 2, website 260 includes web page 270. Web page 270 is a web page that is a part of website 260. In one embodiment, web page 270 is an HTTP web page. Web page 270 includes content that is displayed to a user within a web browser. Web page 270 can also display content based on one or more rules of rules system 200, in accordance with an embodiment, as is described below in greater detail. In one embodiment, an end-user navigates to web page 270 utilizing end-user browser 280. End-user browser 280 is a web browser utilized by the end-user. End-user browser 280 can load a web page, such as web page 270, and display the web page to the end-user within the browser. In one embodiment, end-user browser 280 can be a Microsoft Internet Explorer® browser, or any type of browser. According to the embodiment, the end-user transmits a request for a web page to website 260 utilizing end-user browser 280. In response, website 260 transmits web page 270 to end-user browser 280. End-user browser 280 displays web page 270 to the end-user within end-user browser 280.

According to the illustrated embodiment of FIG. 2, end-user browser 280 navigates to web page 270 of website 260. End-user browser 280 transmits a request to website 260 for web page 270. In response, website 260 transmits web page 270 to end-user browser 280. According to the embodiment, web page 270 includes a reference to rules system 200. In one embodiment, the reference to rules system 200 is a JavaScript reference. However, in other embodiments, the reference to rules system 200 can be written in any scripting language. Also in one embodiment, the reference to rules system 200 include an identifier that uniquely identifies website 260. As an example, the identifier is an account number associated with website 260. However, in other examples, the identifier can be anything that uniquely identifies website 260, such as a sequence of numbers, a sequence of characters, or a combination therein.

End-user browser 280 subsequently transmits a request for browser engine 290. Browser engine 290 is a static scripting language file that contains executable code that can be executed by end-user browser 280. The executable code contained within browser engine 290 can control an operation of web page 270. For example, the executable code contained within browser engine 290 can control a display of content within web page 270. In one embodiment, browser engine 290 is a static JavaScript file. However, in alternate embodiments, browser engine can be a static file written in any scripting language. Furthermore, browser engine 290 is identical for all websites operatively coupled to rules system 200 (including website 260). Because browser engine 290 is static, browser engine 290 can be cached by end-user browser 280 in certain embodiments. Furthermore, because browser engine 290 is static, and does not change, a website provider, such as a provider of website 260, can analyze and evaluate the executable code contained within browser engine 290 for security purposes.

In one embodiment, end-user browser 280 transmits the request for browser engine 290 to rules system 200. In response, rules system 200 transmits browser engine 290 to end-user browser 280. However, this is merely an example embodiment, and in alternate embodiments, end-user browser 280 may transmit the request for browser engine 290 to, and receive browser engine 290 from, any location. As an example, end-user browser 280 may transmit the request for browser engine 290 to website 260, and may receive browser engine 290 from website 260. An alternate embodiment where browser engine 290 transmits the request for browser engine 290 to an edge cache server, and receives browser engine 290 from the edge cache server is described below in greater detail in relation to FIG. 3.

According to an embodiment, end-user browser 280 can execute the executable code contained within browser engine 290. When the executable code requires data from rules system 200, browser engine 290 can transmit a request to rules server 250 of rules system 200. For example, the executable code can require data from rules system 200 when the executable code is required to apply one or more rules to control an operation of web page 270, such as controlling a display of content within web page 270. Furthermore, the request transmitted by browser engine 290 can include data. In certain embodiments, the request transmitted by browser engine 290 can include a request attribute. In one embodiment, the request attribute is a URL attribute. In other embodiments, the request transmitted by browser engine 290 can include an identifier that uniquely identifies website 260. In one embodiment, the identifier is an account number associated with website 260.

According to the embodiment, rules server 250 receives the request transmitted by browser engine 290. Rules server 250 subsequently selects one or more rule scripts from rule scripts 240, 241, and 242 based on the received request. In one embodiment, rules server 250 selects one or more rule scripts from rule scripts 240, 241, and 242 based on a request attribute included within the received request. According to the embodiment, rules server 250 selects each rule script associated with a request attribute that matches the request attribute included within the received request. In an alternate embodiment, rules server 250 selects one or more rule scripts from rule scripts 240, 241, and 242 based on an identifier included within the received request. According to the embodiment, rules server 250 selects each rule script associated with an identifier that matches the identifier included within the received request. In another embodiment, rules server 250 selects one or more rule scripts from rule scripts 240, 241, and 242 based on a combination of a request attribute and an identifier included within the received request.

Subsequently, rules server 250 executes the selected one or more rule scripts. The execution of the selected one or more rule scripts involves the execution of the executable code that is stored within a memory of rules server 250. In one embodiment, where the executable code is of a compiled language, rules server 250 can create an instance of a compiled class that corresponds to each rule script of the selected one or more rule scripts.

The execution of the selected one or more rule scripts generates data. The data can be utilized by browser engine 290 to control an operation of web page 270, such as controlling a display of content within web page 270. For example, the data can include unevaluated conditions, evaluated conditions, and actions that correspond to either an unevaluated condition or an evaluated condition. The data can also include state information (i.e., information about a state of rules server 250). For each rule contained within each rule script, rules server 250 can evaluate as many conditions as possible within rules server 250, so that a size of the generated data is as small as possible. More specifically, in circumstances where rules server 250 can evaluate a condition of a rule and determine an action based on the evaluated condition, rules server 250 can generate data that includes an evaluated condition and a corresponding action, as opposed to generating all possible actions associated with the rule. However, in circumstances when rules server 250 cannot evaluate a condition of a rule, and the condition is required to be evaluated by browser engine 290, rules server 250 can generate data that includes an unevaluated condition and all possible actions associated with the rule. Thus, by evaluating as many conditions as possible within rules server 250, a number of actions that are required to be generated can be reduced, which reduces an overall size of the data that is generated from the execution of the selected one or more rule scripts.

Once the data has been generated, rules server 250 transmits the data to browser engine 290. In one embodiment, rules server 250 transmits the data by transmitting an Extensible Markup Language ("XML") document to browser engine 290 that includes the data. In another embodiment, rules server 250 transmits the data by transmitting one or more JavaScript Object Notation ("JSON") objects to browser engine 290 that includes the data. According to the embodiment, the data does not include executable code, and thus, rules server 250 does not transmit any executable code to browser engine 290, in response to a request from browser engine 290. Instead, the only executable code that rules server 250 transmits to end-user browser 280 is browser engine 290. The absence of executable code within the data transmitted by rules server 250 to browser engine 290 can significantly reduce the size of the data that is transmitted. This can significantly reduce an overall processing time, and can increase overall performance.

In accordance with the embodiment, browser engine 290 utilizes the data received from rules server 250 to control an operation of web page 270. In one example embodiment, browser engine 290 utilizes the data received from rules server 250 to control a display of content within web page 270. For example, browser engine 290 utilizes the received data to display a web-based communication link, such as a click-to-call or click-to-chat communication link, within web page 270. According to the example, in a web-based communication, a user can click an object (such as a button, image, text, or other type of icon) displayed within web page 270 to request an immediate connection with an individual, such as an agent. When the web-based communication is a click-to-call communication, the immediate connection may be a telephone connection. When the web-based communication is a click-to-chat communication, the immediate connection may be a web-based chat session.

In one embodiment, rules server 250 uses a stateful session to persist a user state for a current session in a memory of rules server 250. The user state can include such data as one or more web pages visited by a user, and one or more sessions conducted by the user. The user state can be retrieved for each subsequent request and thus, the user state does not need to be rebuilt for each request. Furthermore, because the user state for the current session is persisted in the memory of rules server 250, rules server 250 is not required to persist the user state in one or more cookies stored within end-user browser 280. In one embodiment, rules server 250 can utilize load balancing to ensure requests from end-user browser 280 are transmitted to rules server 250. The user state can be retrieved from the memory of rules server 250 when a request from end-user browser is received. Persisting the user state within the memory of rules server 250 can increase an overall performance of rules system 200, as less processing time is required to rebuild a user state. Furthermore, persisting the user state within the memory of rules server 250 can increase overall security, as the user state does not need to be transmitted to end-user browser 280 to be stored in one or more cookies. Finally, by persisting the user state within the memory of rules server 250, a size of the user state is not limited by the size of one or more cookies. Thus, a larger user state can be persisted, which results in more data about the user being persisted.

Figure 3:
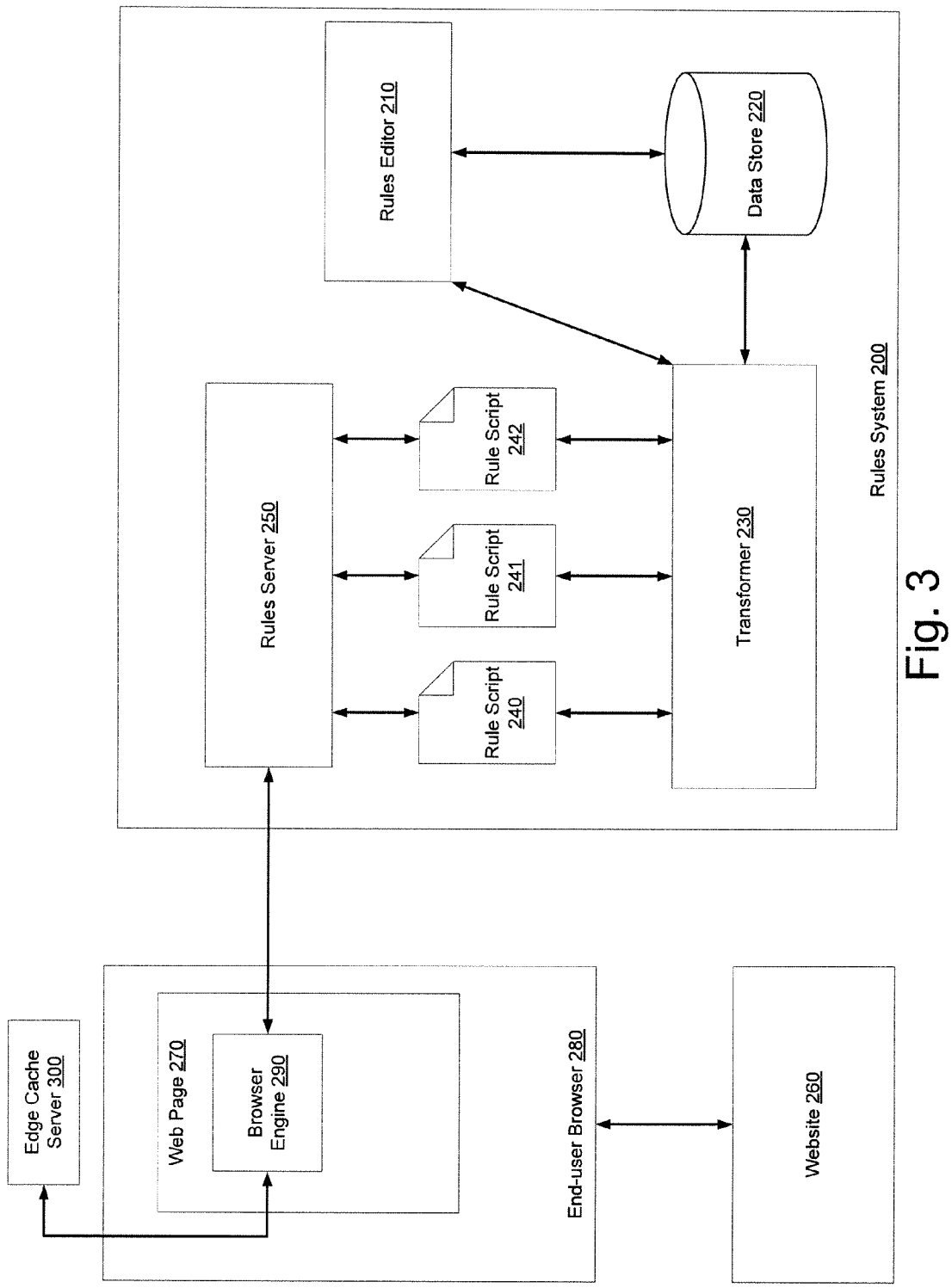
FIG. 3 illustrates a block diagram of a website operatively coupled to a rules system according to another embodiment of the invention.

FIG. 3 illustrates a block diagram of a website operatively coupled to rules system 200 according to another embodiment of the invention. The illustrated embodiment of FIG. 3 is similar to the illustrated embodiment of FIG. 2, and similar components that are described in relation to FIG. 2 are not described again in relation to FIG. 3. According to the embodiment, end-user browser 280 transmits the request for browser engine 290 to edge cache server 300, rather than rules server 250. Furthermore, end-user browser 280 receives browser engine 290 from edge cache server 300 rather than rules server 250. An edge cache server, such as edge cache server 300, is a server configured to store a cached copy of one or more web pages, where a cache copy of a web page is a copy of a web that is created and stored when the original web page is first retrieved. This reduces the processing time for subsequent retrievals of the web page. In one embodiment, edge cache server 300 can be an Akamai® edge cache server. By utilizing edge cache server 300, which can be located in a very close proximity to end-user browser 280, browser engine 290 can be transmitted to end-user browser 280 very rapidly.

Figure 4:
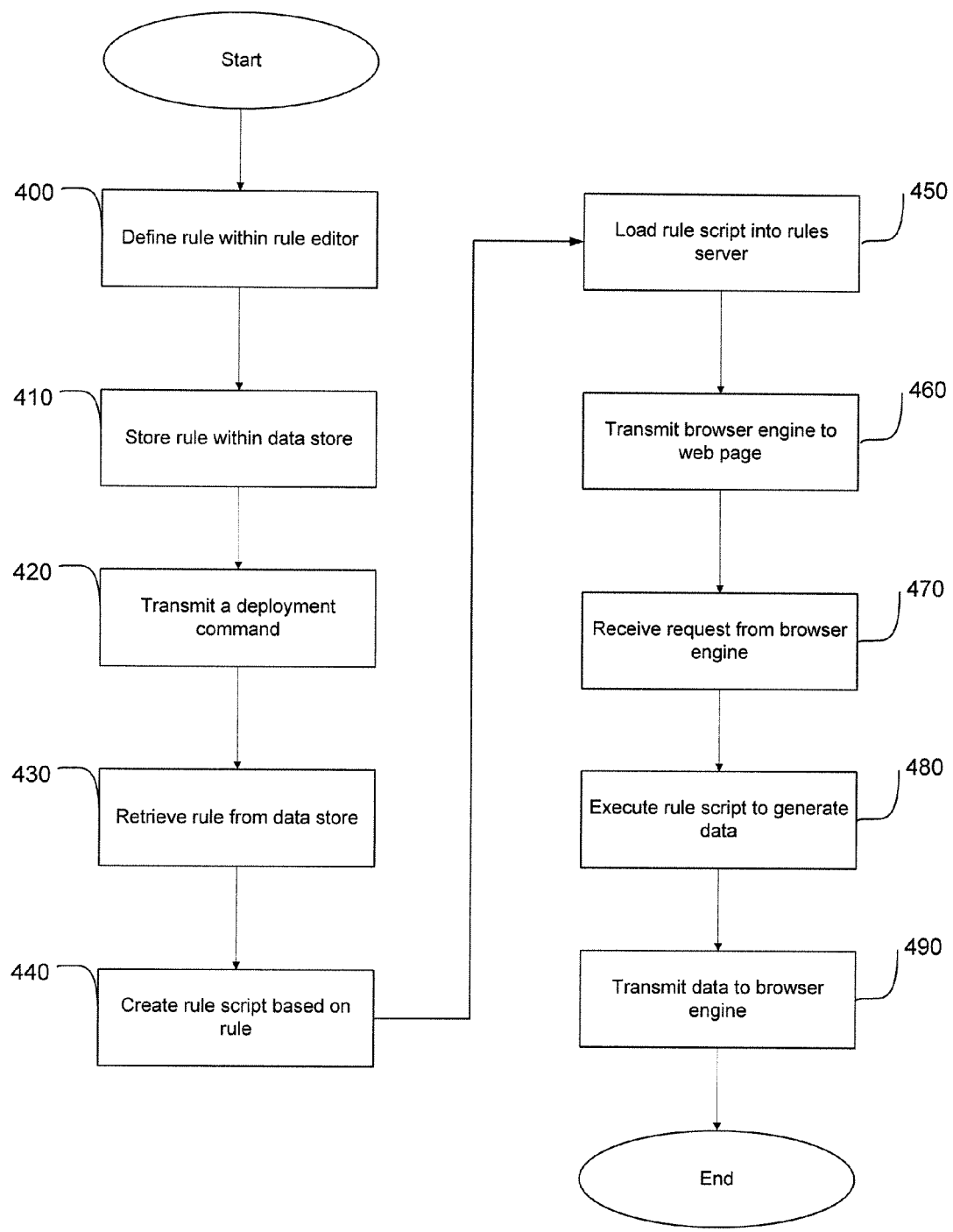
FIG. 4 illustrates a flow diagram of a rule script execution module according to an embodiment of the invention.

FIG. 4 illustrates a flow diagram of a rule script execution module according to an embodiment of the invention. In one embodiment, the functionality of the flow diagram of FIG. 4, as well as the functionality of the flow diagram of FIG. 5, described below, is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 400, a rule is defined within a rule editor. In one embodiment, the defining of the rule can include creating the rule within the rule editor. In another embodiment, the defining of the rule can include modifying the rule within the rule editor. The rule editor can display a user interface to a user within a web browser, and a user can interface with the rules editor using the user interface of the web browser to define a rule. The defining of the rule can include defining at least one condition and at least one related action for the rule. In one embodiment, an action for the rule can control a display of content within a web page of a web site.

At 410, the rule is stored within a data store. In one embodiment, the rule is stored as part of a rule set that is also stored within the data store. In one embodiment, the data store can be a database, where the rule is stored as a record within the database. In another embodiment, the data store can be a file, where the rule is stored within the file. In yet another embodiment, the data store can be a file system that includes a plurality of files, where the rule is stored within a file of the plurality of files.

At 420, a deployment command is transmitted. The deployment command includes a command to deploy one or more rules stored within the data store. In one embodiment, the deployment command can also include a filter that can be applied to the one or more rules stored within the data store. As an example, the filter can indicate that only the rules associated with a website are to be deployed.

At 430, a rule is retrieved from the data store. In an embodiment where a deployment command includes a filter, the filter can be applied to the data store to only retrieve a rule that satisfies the filter.

At 440, a rule script is created based on the rule that is retrieved from the data store. In one embodiment, a rule script is created by generating executable code for the rule that is retrieved from the data store and storing the executable code within a rule script. In one embodiment, a rule script that is created corresponds to a website. The website is defined using a request attribute, where the defined request attribute is stored within the data store. In one embodiment, the executable code is of a compiled language. In another embodiment, the executable code is of a scripting language. Furthermore, in one embodiment, the rule script is a synthetic variable rule script, and the executable code is of a synthetic variable scripting language.

At 450, the rule script is loaded into a rules server. In one embodiment, where the rule script is loaded into the rules server, the rule script is also stored within a memory of the rules server. Also in an embodiment where the rule script includes executable code, the executable code is also stored within the memory of the rules server. In an embodiment, where the rule script includes executable code of a compiled language, the rule script is also dynamically converted into a compiled class that can be stored and executed within the memory of the rules server.

At 460, a browser engine is transmitted to a web page. In one embodiment, the browser engine is a static scripting language file that contains executable code that can be executed by a end-user browser. The executable code contained within the browser engine can control an operation of the web page, such as controlling a display of content within the web page. In an alternate embodiment, an edge cache server can transmit the browser engine to the web page.

At 470, a request is received from the browser engine. In one embodiment, the request is a request to receive data corresponding to a rule so that the rule can be applied to control an operation of the web page, such as controlling a display of content within the web page. Also in one embodiment, the request can include data. In one embodiment where the request includes data, the request includes a request attribute. In another embodiment where the request includes data, the request includes an identifier that uniquely identifies a website that the web page is associated with.

At 480, the rule script is executed to generate data. The rule script is executed in response to the received request. In one embodiment, the execution of the rule script involves the execution of the executable code stored within the memory of the rules server. Furthermore, in a embodiment where the executable code is of a compiled language, an instance of a complied class that corresponds to the rule script is created. In one embodiment, the rule script is first selected before it is executed. In this embodiment, the rule script is selected based on a request attribute included within the received request. In an alternate embodiment, the rule script is selected based on an identifier included within the received request. In yet another alternate embodiment, the rule script is selected based on a combination of a request attribute and an identifier included within the received request. Furthermore, in one embodiment, the data generated by the execution of the rule script can be utilized by the browser engine, to control an operation of the web page, such as controlling a display of content within the web page. The data can include unevaluated conditions, evaluated conditions, and actions that correspond to either an unevaluated condition or an evaluated condition. The data can also include state information, where the state information is information about a state of the rules server.

At 490, the data is transmitted to the browser engine. In one embodiment, the data is transmitted by transmitting a XML document to the browser engine, where the XML document includes the data. In an alternate embodiment the data is transmitted by transmitting one or more JSON objects to the browser engine, where the one or more JSON objects include the data. According to the embodiment, the data does not include any executable code.

Figure 5:
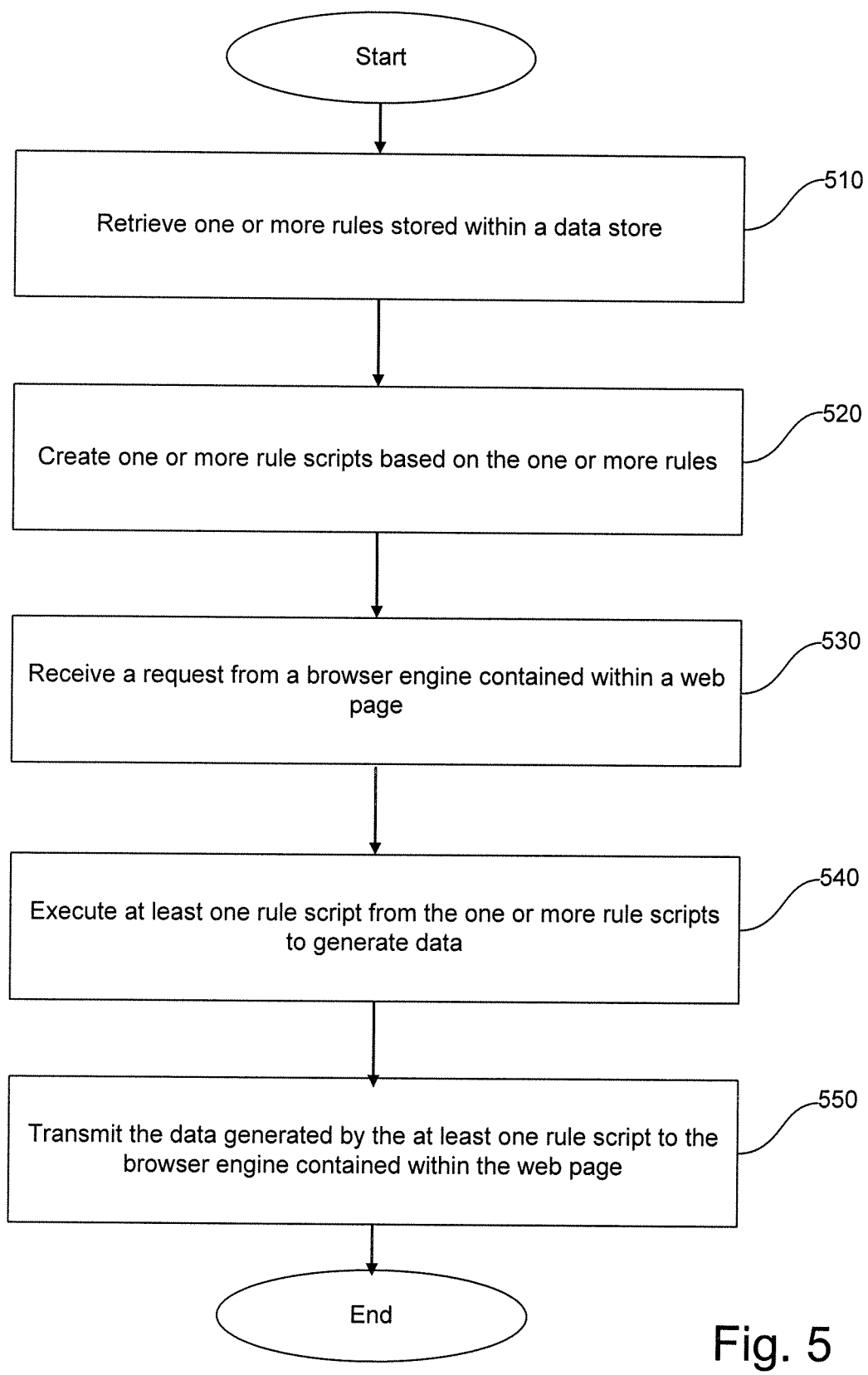
FIG. 5 illustrates another flow diagram of the functionality of a rule script execution module according to an embodiment of the invention.

FIG. 5 illustrates another flow diagram of the functionality of a rule script execution module according to an embodiment of the invention. At 510, one or more rules that are stored within a data store are retrieved. Each rule includes one or more conditions and one or more actions, where each action includes an instruction to display content within the web page. In one embodiment, a filter can be applied to the data store to only retrieve one or more rules that satisfy the filter.

At 520, one or more rule scripts are created based on the one or more rules. In one embodiment, each rule script includes executable code. In an embodiment, the executable code is of a compiled language. In another embodiment, the executable code is of a scripting language. Furthermore, in one embodiment, each rule script is a synthetic variable rule script, and the executable code is of a synthetic variable scripting language.

At 530, a request is received from a browser engine contained within a web page. In one embodiment, the request is a request to receive data corresponding to a rule so that the rule can be applied to control an operation of the web page, such as controlling a display of content within the web page. The request can include data. In one embodiment where the request includes data, the request includes a request attribute. In another embodiment where the request includes data, the request includes an identifier that uniquely identifies a website that the web page is associated with.

At 540, at least one rule script from the one or more rule scripts is executed to generate data. The at least one rule script is executed in response to the received request. In one embodiment, the execution of the at least one rule script involves the execution of the executable code of the at least one rule script. Furthermore, in a embodiment where the executable code is of a compiled language, an instance of a complied class that corresponds to the at least one rule script is created. In one embodiment, the at least one rule script is first selected before it is executed. In this embodiment, the at least one rule script is selected based on a request attribute included within the received request. In an alternate embodiment, the at least one rule script is selected based on an identifier included within the received request. In yet another alternate embodiment, the at least one rule script is selected based on a combination of a request attribute and an identifier included within the received request. Furthermore, in one embodiment, the data generated by the execution of the at least one rule script can be utilized by the browser engine, to control an operation of the web page, such as controlling a display of content within the web page. In one embodiment, the data can include unevaluated conditions, evaluated conditions, and actions that correspond to either an unevaluated condition or an evaluated condition. In another embodiment, the data can also include state information.

At 550, the data generated by the at least one rule script is transmitted to the browser engine contained within the web page. In one embodiment, the data is transmitted by transmitting a XML document to the browser engine, where the XML document includes the data. In an alternate embodiment the data is transmitted by transmitting one or more JSON objects to the browser engine, where the one or more JSON objects include the data. According to the embodiment, the data does not include any executable code.

Thus, according to an embodiment, a rules system is provided that can control the content of one or more web pages, based on one or more rules stored within the rules system. The rules system can transmit data to the one or more web pages that can control the content, where the data does not include any executable code. Thus, the rules system can provide a fast and predictable execution utilizing transformation of a rule to a rule script, where the rule script includes executable code. The use of a browser engine within an end-user browser allows for a rapid runtime operation, where the browser engine can be cached by the end-user browser. Finally, the rules system can persist an unlimited amount of data associated with the user, which allows for unlimited tracking of the user's session.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to control content displayed within a web page, the controlling comprising:

at a rules editor module:
displaying a graphical user interface to a user;
receiving a definition of a rule associated with a web page from the user, the rule comprising one or more conditions and one or more actions, at least one action comprising an instruction to display content within the web page;
storing the rule in a data store; and
transmitting a deployment command to permit access to the rule;

at a transformer module:
after receiving the deployment command to permit access to the rule, retrieving the rule associated with the web page from the data store;
creating a rule script corresponding to the web page based on the rule associated with the web page, the rule script comprising executable code; and
transmitting a notification that the rule script has been created;

at a rules server module:
after receiving the notification that the rule script has been created, receiving a request from a browser engine contained within the corresponding web page;
executing the rule script to generate data based on the request; and
transmitting the data generated by the rule script to the browser engine contained within the corresponding web page.

2. The computer-readable medium of claim 1, wherein the executable code comprises executable code of a complied language.

3. The computer-readable medium of claim 1, wherein the executable code comprises executable code of a scripting language.

4. The computer-readable medium of claim 1, wherein the one or more rule scripts each comprise a synthetic variable rule script, and wherein the executable comprises executable code of a synthetic variable scripting language.

5. The computer-readable medium of claim 1, wherein the transmitting the data further comprises transmitting an extensible markup language document that comprises the data to the browser engine.

6. The computer-readable medium of claim 1, wherein the transmitting the data further comprises transmitting one or more Java Script Object Notation (JSON) objects that comprise the data to the browser engine.

7. The computer-readable medium of claim 1, wherein the request includes a request attribute.

8. The computer-readable medium of claim 7, the instructions further comprising selecting at least one rule script from the one or more rule scripts to be executed based on the request attribute.

9. The computer-readable medium of claim 1, wherein the request includes an identifier.

10. The computer-readable medium of claim 9, the instructions further comprising selecting at least one rule script from the one or more rule scripts to be executed based on the identifier.

11. A computer-implemented method for controlling content displayed within a web page, the computer-implemented method comprising:

at a rules editor module:
displaying a graphical user interface to a user;
receiving a definition of a rule associated with a web page from the user, the rule comprising one or more conditions and one or more actions, at least one action comprising an instruction to display content within the web page;
storing the rule in a data store; and
transmitting a deployment command to permit access to the rule;

at a transformer module:
after receiving the deployment command to permit access to the rule, retrieving the rule associated with the web page from the data store;
creating a rule script corresponding to the web page based on the rule associated with the web page, the rule script comprising executable code; and
transmitting a notification that the rule script has been created;

at a rules server module:
after receiving the notification that the rule script has been created, receiving a request from a browser engine contained within the corresponding web page;
executing the rule script to generate data based on the request; and transmitting the data generated by the rule script to the browser engine contained within the corresponding web page.

12. The computer-implemented method of claim 11, wherein the executable code comprises executable code of a complied language.

13. The computer-implemented method of claim 11, wherein the one or more rule scripts each comprise a synthetic variable rule script, and wherein the executable comprises executable code of a synthetic variable scripting language.

14. The computer-implemented method of claim 11, wherein the transmitting the data further comprises transmitting an extensible markup language document that comprises the data to the browser engine.

15. The computer-implemented method of claim 11, wherein the transmitting the data further comprises transmitting one or more Java Script Object Notation (JSON) objects that comprise the data to the browser engine.

16. A rules system, comprising a processor coupled to a memory storing a plurality of modules executable by the processor, the plurality of modules including:
    a rules editor module configured to:
        display a graphical user interface to a user,
        receive a definition of a rule associated with a web page from the user, the rule comprising one or more conditions and one or more actions, at least one action comprising an instruction to display content within the web page,
        store the rule in a data store, and
        transmit a deployment command to permit access to the rule;
    a transformer module configured to:
        after receiving the deployment command to permit access to the rule, retrieve the rule associated with the web page from the data store,
        create a rule script corresponding to the web page based on the rule associated with the web page, the rule script comprising executable code, and
        transmit a notification that the rule script has been created; and
    a rules server module configured to:
        after receiving the notification that the rule script has been created, receive a request from a browser engine contained within the corresponding web page,
        execute the rule script to generate data based on the request, and
        transmit the data generated by the rule script to the browser engine contained within the corresponding web page.

17. The rules system of claim 16, wherein the executable code comprises executable code of a complied language.

18. The rules system of claim 16, wherein the one or more rule scripts each comprise a synthetic variable rule script, and wherein the executable comprises executable code of a synthetic variable scripting language.

19. The rules system of claim 16, wherein the rules server module is further configured to transmit an extensible markup language document that comprises the data to the browser engine.

20. The rules system of claim 16, wherein the rules server module is further configured to transmit one or more Java Script Object Notation (JSON) objects that comprise the data to the browser engine.

* * * * *

UNITED STATES PATENT AND TRADEMARK OFFICE
CERTIFICATE OF CORRECTION

| | | |
|---|---|---|
| PATENT NO. | : 9,081,866 B2 | Page 1 of 1 |
| APPLICATION NO. | : 13/241417 | |
| DATED | : July 14, 2015 | |
| INVENTOR(S) | : Coleman et al. | |

It is certified that error appears in the above-identified patent and that said Letters Patent is hereby corrected as shown below:

In the specification,

In column 5, line 22, delete "242)." and insert -- 242), --, therefor.

Signed and Sealed this
First Day of March, 2016

Michelle K. Lee
*Director of the United States Patent and Trademark Office*